United States Patent
Findlay et al.

(10) Patent No.: US 6,262,718 B1
(45) Date of Patent: Jul. 17, 2001

(54) TOUCH-SENSITIVE DISPLAY APPARATUS

(75) Inventors: Valerie McLaren Findlay, Glasgow; Andrew Knox, Kilbirnie, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/357,626

(22) Filed: Dec. 16, 1994

(30) Foreign Application Priority Data

Jan. 19, 1994 (GB) .................................................. 9400983

(51) Int. Cl.[7] .......................................................... G09G 5/00
(52) U.S. Cl. ............................................. 345/178; 345/173
(58) Field of Search .................................... 345/173, 174, 345/175, 178, 179, 180, 182, 156, 157; 178/18

(56) References Cited

U.S. PATENT DOCUMENTS

| | | | |
|---|---|---|---|
| 4,710,758 | * 12/1987 | Mussler et al. ....................... | 345/178 |
| 4,929,935 | * 5/1990 | Rysavy et al. ....................... | 345/178 |
| 5,204,661 | * 4/1993 | Hack et al. ........................... | 345/179 |
| 5,283,559 | * 2/1994 | Kalendra et al. ..................... | 345/156 |
| 5,448,263 | * 9/1995 | Martin .................................. | 345/173 |

* cited by examiner

*Primary Examiner*—Steven Saras
(74) *Attorney, Agent, or Firm*—Bracewell & Patterson, LLP

(57) ABSTRACT

A touch-sensitive display apparatus is disclosed, which includes a display screen. A display drive means is connected to the display screen for generating an image on the display screen in response to an input video signal. A display processor is connected to the display drive means for generating, in response to one or more image control signals, at least one drive control signal for configuring the display drive means to move the displayed image relative to the display screen. Touch sensing means generates a touch input signal in response to a tactile stimulus of the display screen. The touch input signal is indicative of the location of the tactile stimulus on the touch screen. A touch processor is connected to the touch sensing means for converting, in dependence on calibration data stored in a touch memory, the touch input signal into coordinates defining the location of the tactile stimulus on the display screen relative to features in the image displayed on the display screen. The display processor includes means for communicating correction data indicative of movement of the displayed image relative to the display screen to the touch processor. Touch processor comprises means for automatically adjusting the calibration data stored in the touch memory to re-align the coordinates generated by the touch processor to features in the displayed image in response to the correction data received from the display processor.

16 Claims, 2 Drawing Sheets

TOUCH-SENSITIVE DISPLAY APPARATUS

BACKGROUND OF THE INVENTION

1. Technical Field

The present invention relates in general to a data processing system, and in particular to touch-sensitive display apparatus for inputting instructions to a data processing system in response to tactile stimuli. Still more particularly, the present invention relates to a touch-sensitive display apparatus which does not require recalibration when image parameters are adjusted.

2. Description of the Related Art

Many raster-scanned display devices, such as cathode ray tube displays and liquid crystal displays are now designed to be compatible with a wide range of different computer systems each capable of generating one or more different raster display formats or "modes". Each mode is generally characterized by a different pair of line and frame synchronization frequencies. Such display devices usually have user controls which permit an operator to correct geometric image distortions such as East-West pin-cushion distortion or trapezoidal distortion. The user controls also permit the operator to adjust parameters of the displayed image such as width, height and position according to personal preference.

A typical touch sensitive display comprises a display device which has a transparent touch screen mounted on its display screen. The touch screen includes sensors for detecting a touch on the touch screen by, for example, a stylus or an operator's finger. A touch screen processor converts the outputs of the sensors into cartesian coordinates indicative of the position of the touch on the screen. The coordinates are communicated typically to a host computer system to which the touch display is connected via a serial port such as an RS232 port. The host computer system responds to the input touch coordinates by moving a cursor on the display screen to the position at which the touch was applied.

Conventionally, a calibration routine is performed to align the coordinates produced by the touch screen processor with data displayed on the screen. The calibration routine is typically in the form of computer program microcode stored partly in a touch memory of the touch display and partly in the host computer system as device driver software. Typically, the host computer system starts the calibration routine in response to an instruction from the user. The host computer system, under control of the calibration code in the device driver software, responds by generating targets in the top left and bottom right corners of the display area. The user is then instructed to touch the screen at each of the targets in turn. The outputs generated by the sensors in response to the touches are detected by the touch processor and stored as digital reference values or calibration data in the touch memory. The calibration microcode stored in the touch memory instructs the touch processor to associate the reference values stored in the touch memory with the top left and bottom right corners of the display area. The touch processor, under the control of the calibration microcode in the touch memory assigns top left and bottom right coordinates of a field of sensitivity to the reference values stored in the touch memory. The calibration microcode stored in the touch memory then instructs the touch processor to interpolate between the values stored in the touch memory to assign intermediate values to a grid of coordinates extending between the top left and bottom right coordinates of the field of sensitivity. The touch processor effectively produces a look up table for mapping digital values corresponding to outputs from the sensors to coordinates within the field of sensitivity. The coordinates of the field of sensitivity thus map directly to the display area. On completion of the mapping, the touch processor sends to message to the host computer system to indicate that the calibration routine is complete. In response to the message, the host computer system reverts to running normal application software.

A problem with this arrangement is that if the displayed image is moved relative to the field of sensitivity, the calibration data stored in the touch memory is invalidated. Therefore, a touch to, for example, an icon displayed in the displayed area may not invoke the execution of the desired task by the host computer system. If the mismatch is extreme, the coordinates received by the host computer system may even invoke the unwanted execution of another task. Therefore, in conventional touch displays, the calibration routine must be repeated each time the image parameters are adjusted. It should also be appreciated that, in conventional touch displays, the calibration data may also be invalidated by a change in display mode because the image may move from one display mode to another.

Consequently, it would be desirable to provide a data processing system having a touch screen which does not require recalibration when image display parameters are modified.

SUMMARY OF THE INVENTION

It is therefore one object of the present invention to provide an improved data processing system.

It is another object of the present invention to provide an improved touch-sensitive display apparatus for inputting data to a data processing system.

It is yet another object of the present invention to provide an improved touch-sensitive display apparatus which does not require recalibration in response to modification of image display parameters.

The foregoing objects are achieved as is now described. A touch-sensitive display apparatus is disclosed, which includes a display screen. A display drive means is connected to the display screen for generating an image on the display screen in response to an input video signal. A display processor is connected to the display drive means for generating, in response to one or more image control signals, at least one drive control signal for configuring the display drive means to move the displayed image relative to the display screen. Touch sensing means generates a touch input signal in response to a tactile stimulus of the display screen. The touch input signal is indicative of the location of the tactile stimulus on the touch screen. A touch processor is connected to the touch sensing means for converting, in dependence on calibration data stored in a touch memory, the touch input signal into coordinates defining the location of the tactile stimulus on the display screen relative to features in the image displayed on the display screen. The display processor includes means for communicating correction data indicative of movement of the displayed image relative to the display screen to the touch processor. Touch processor comprises means for automatically adjusting the calibration data stored in the touch memory to re-align the coordinates generated by the touch processor to features in the displayed image in response to the correction data received from the display processor.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
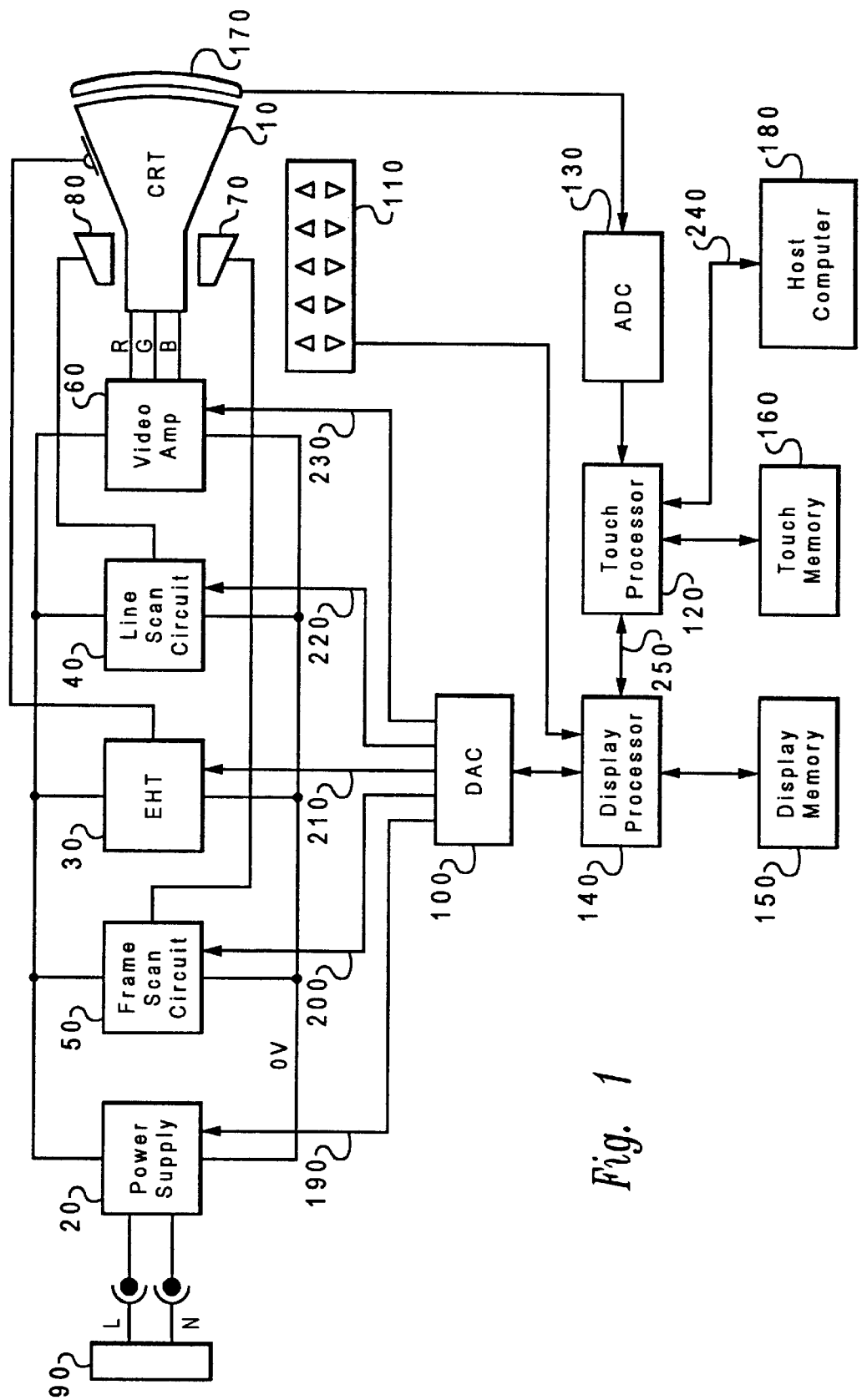
FIG. 1 is a block diagram of a preferred embodiment of the touch sensitive display apparatus of the present invention.

Referring first to FIG. 1, a preferred embodiment of a touch sensitive display apparatus utilizing the present invention comprises a color cathode ray display tube (CRT) 10 connected to an Extra High Tension (EHT) generator 30 and a video amplifier 60. Line and frame deflection coils 80 and 70, respectively, are disposed around the neck of the CRT 10. Deflection coils 80 and 70 are connected to line and frame scan circuits 40 and 50, respectively. line scan circuit 40 and EHT generator 30 may each be in the form of a fly back circuit, the operation of which is well known by those skilled in the art. Furthermore, as is also well-known in the art, EHT generator 30 and line scan circuit 40 may be integrated in a single flyback circuit. A power supply 20 is connected via power supply rails $V_s$ and 0V to EHT generator 30, video amplifier 60, and line and frame scan circuits 40 and 50. In use, power supply provides electrical power on supply rails $V_s$ and 0V from Line and Neutral connections L and N to the domestic electricity main supply 90. Power supply 20 may be in the form of a switch mode power supply, the operation of which is well-understood by those skilled in the art.

Power supply 20, EHT generator 40, video amplifier 60, and line and frame scan circuits 40 and 50 are each connected via a digital to analog (D to A) convertor 100 to outputs of a display processor 140. Display processor 140 comprises processor logic, preferably in the form of a microprocessor. Display processor 140 is connected via address and data buses to a display memory 150. A user control panel 110 is connected to key-pad interrupt lines of display processor 140. Control panel 110 comprises a plurality of manual operable switches.

A touch sensitive screen 170 is provided on CRT 10. Touch screen 170 comprises sensors (not shown) for detecting a tactile stimulus of the screen. Touch screen 170 may be implemented by conventional techniques. For example, touch screen 170 may include a system of strain gauges in bezel mountings of CRT 10. Alternatively, touch screen 170 may include a capacitive or surface acoustic wave overlay on the screen of CRT 10. The output of the sensors of touch screen 170 are connected, via an analog to digital (A to D) convertor 130 to a touch processor 120. Touch processor 120 comprises processor logic, preferably in the form of a microprocessor. Touch processor 120 is connected via address and data buses to a touch memory 160. Touch processor 120 is also connectable to a host computer system 180 such as a personal computer via a communication link 240. Communication link 240 may be a mouse interface or a serial link such as an RS232 link.

In operation, EHT generator 30 generates an electric field within CRT 10 for accelerating electrons in beams corresponding to the primary colors of red, green and blue towards the screen of CRT 10. Line and frame scan circuits 40 and 50 generate line and frame scan currents in deflection coils 70 and 80. The line and frame scan currents are in the form of ramp signals to produce time-varying magnetic fields that scan the electron beams across the screen of CRT 10 in a raster pattern. The line and frame scan signals are synchronized by line and frame scan circuits 40 and 50 to input line and frame synchronization (sync) signals (not shown) generated, for example, by a host computer system 180 to which the display apparatus is connected. Video amplifier 60 modulates the red, green and blue electron beams to produce an output display on CRT 10 as a function of corresponding red, green and blue input video signals (not shown) also generated by the host computer system 180.

Display processor 140 is configured by computer program microcode stored in display memory 150 to control the outputs of EHT generator 30, video amplifier 60, power supply 20 and line and frame scan circuits 40 and 50 via D to A convertor 100 and control links 190 to 230 as functions of display mode data stored in memory 150 and inputs from user control 110. The display mode data stored in memory 150 includes sets of preset image parameter values each corresponding to a different popular display mode such as, for example, 1024×768 pixels, 640×480 pixels, or 1280× 1024 pixels. Each set of image display parameter values includes height and centering values for setting the output of frame scan circuit 50 via control link 200, and width and centering values for controlling line scan circuit 40 via control link 220. In addition, memory 150 includes common preset image parameter values for controlling the gain and cut-off of each of the red, green and blue channels of video amplifier 60 via control link 230; and preset control values for controlling the outputs of EHT generator 30 and power supply 20 via control links 190 and 210. The parameter values stored in memory 150 are selected by display processor 140 under microcode control in response to input mode information from host computer system 180. The mode information may be provided to the display conventionally, for example, by coding input line and frame sync signals generated by host computer system 180. Display processor 140 processes the selected image parameter values to generate digital outputs to D to A convertor 100. D to A convertor 100 converts the digital outputs from display processor 140 into analog control levels on control links 190–230.

A user may also manually adjust the digital values controlling red, green and blue video gains and cutoffs at video amplifier 60; and image width, height, and centering at line and frame scan circuit 40 and 50 via the user control panel 110. User control panel 110 includes a set of up/down control keys for each of image height, centering, width, brightness and contrast. When, for example, the width up key is depressed, user control panel 110 issues a interrupt to display processor 140. The source of the interrupt is determined by display processor 140 via an interrupt polling routine in the controlling microcode. In response to the interrupt from the width key, display processor progressively increases the corresponding digital output at D to A convertor 100, thereby increasing the corresponding analog level sent to line scan circuit 40 on control link 220. The width of the image progressively increases. When the desired width is reached, the user releases the key. The removal of the interrupt is detected by display processor 110, and the digital value setting the width control level on control link 220 is retained. The height, centering, brightness and contrast setting can be adjusted by the user in similar fashion. User control panel 110 further includes a store key. When the user depresses the store key, an interrupt is produced to which display processor 140 responds by storing in memory 150 parameter values corresponding the current settings of the digital outputs to D to A convertor 100. The user can thus program into the display device specific display image parameters according to personal preference.

When a user touches touch screen 170 with a finger or stylus, the sensors of touch screen 170 generate analog signals indicative of the location and force of the touch. The analog signals are converted to digital values by A to D convertor 130. Touch processor 120 is configured by microcode stored in touch memory 160 to translate the positional digital values received from A to D convertor 130 into cartesian (X,Y) coordinate data as a function of calibration data also stored in the touch memory. The calibration data effectively subdivides the touch screen into a grid of coordinate points. The coordinate data is transmitted by touch processor 120 to host computer system 180 via communication link 240. Communication link 240 may be a serial communication link such as an RS232 communication link or the like.

To calibrate touch screen 170 after, for example, power on, a calibration routine may be executed to determine the calibration data for storage in touch memory 160. The calibration routine is in the form of computer program microcode stored partly in touch memory 160 and partly in host computer system 180 as device driver software. When the touch display is turned on, touch processor 120, under control of the calibration microcode stored in touch memory 160, sends a command to host computer system 180 via link 240 requesting that host computer system 180 start the calibration routine.

Figure 2:
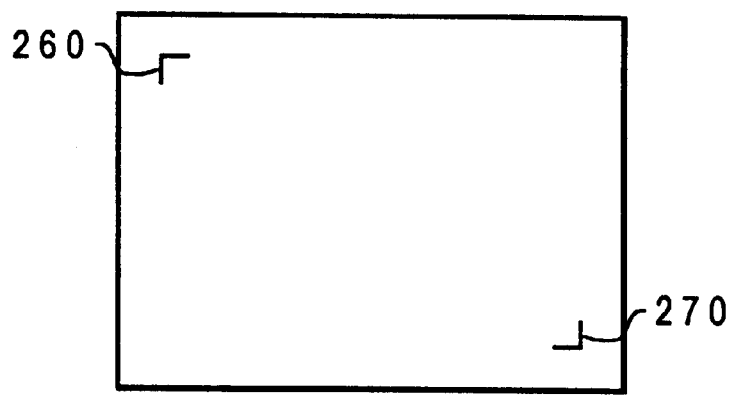
FIG. 2 is a front view of the display screen of the display apparatus showing the location of a basic set of calibration points.

Referring now to FIG. 2, host computer system 180, under control of the calibration code in the device driver software, responds to the request from touch processor 120 by generating targets 260 and 270 in the top left and bottom right corners of the display area on the screen of CRT 10. The user is instructed to touch the screen at each of the targets 260 and 270 in turn. The analog outputs generated by the sensors of touch screen 170 in response to the touches are converted to digital values by A to D convertor 130. The digital values are detected by touch processor 120 and stored as calibration data in touch memory 160. The calibration microcode stored in touch memory 160 instructs touch processor 120 to associate the reference values stored in touch memory 160 with the top left and bottom right corners of the display area. Touch processor 120, under the control of the calibration microcode in touch memory 160 assigns top left and bottom right coordinates of a field of sensitivity to the reference values stored in touch memory 160. The calibration microcode stored in touch memory 160 then instructs touch processor 120 to interpolate between the values stored in touch memory 160 to assign intermediate values to a grid of coordinates extending between the top left and bottom right coordinates of the field of sensitivity. Touch processor 120 effectively produces a look-up table for mapping digital values corresponding to outputs from the sensors of touch screen 170 to coordinates within the field of sensitivity. The coordinates of the field of sensitivity thus map directly to the display area on the screen of CRT 10. On completion of the mapping, touch processor 120 sends a message to host computer system 180 to indicate that the calibration routine is complete. In response to the message, host computer system 180 reverts to running normal application software.

In accordance with the present invention, touch processor 120 is connected to display processor 140 via a communication bus 250 such as an I²C bus or the like. In operation, if the image height, width or centering setting stored in display memory 150 are changed, either by manual adjustment via user control 110 or by a change in display mode issued by host computer system 180, display processor 140 is configured by microcode stored in display memory 150 to communicate change data indicative of the magnitude of the change in image parameters to touch processor 120 via bus 250. Touch processor 120, under the control of microcode stored in touch memory 160, responds to the change data received from display processor 140 by adjusting the calibration data stored in touch memory 160 to re-align the field of sensitivity of touch screen 170 with the new dimensions and/or positioning of the displayed image. Thus, touch sensitive display apparatus of the present invention does not have to be recalibrated each time the display mode is changed or the dimensions and/or positioning of the image is required. The apparatus of the present invention can be calibrated once upon initial power on, and thereafter it automatically compensates for image movement produced by a mode change or by manual adjustment of the displayed image.

What follows is a description of an algorithm for adjusting the horizontal axis calibration data stored in touch memory 160 in accordance with the present invention. For the purpose of the description, assume:

i) CRT 10 is a so-called 14-inch CRT having a normal image width of 250 mm;

ii) D to A convertor 100 and display processor 140 in combination provide a range of width extending from 215 mm to 279 mm; and iii) D to A convertor 100 provides 6 bit D to A conversion.

D to A convertor 100 therefore has 64 possible output states. Thus, a 1 mm change in image width corresponds to a Least Significant Bit change in the output of D to A convertor 100. The image width varies symmetrically about an imaginary line passing vertically through the centers of the displayed image. Thus, a 1 mm increase in width corresponds to the left and right edges of the displayed image each moving by 0.5 mm relative to the screen of CRT 10.

Values indicating that the minimum image width is 215 mm and that the Least Significant Bit of input data to D to A convertor 100 corresponds to a width change of 1 mm are preprogrammed in touch memory 160 during manufacture. The image width can therefore be defined as $$\text{IMAGE WIDTH} = (215 + \text{DAC\_VAL})\text{mm}$$

Where DAC_VAL is the digital input to D to A convertor 100.

In accordance with the algorithm, when the user increases the image width by 1 mm, display processor 140 sends the new DAC_VAL to touch processor 120. On receipt of the new DAC_VAL, touch processor 120 adjusts the horizontal axis calibration data by 0.5 mm on either side of the center of the field of sensitivity. For example, if the origin of the field of sensitivity of touch screen 170 is central (i.e., the horizontal and vertical axes of the coordinates produced by touch processor 120 intersect at the center of the field of sensitivity), touch processor 120 subtracts a value representing 0.5 mm to the left side reference value and adds a value representing 0.5 mm to the right side reference value.

In another algorithm for adjusting the horizontal axis calibration data in accordance with the present invention, touch memory 160 is processor is preprogrammed during manufacture with the available range of image width from the minimum to the maximum settings of the input to D to A convertor 100. In accordance with the algorithm, to initially calibrate the apparatus, the left and right reference values are stored in touch memory 160 for the particular input to D to A convertor 100 at the time. Subsequently, the algorithm adjusts the left and right reference values in response to a change in image width (i.e., a change in the input of D to A convertor 100) according to the following equations:

$$LEFT\_CAL_{new} = LEFT\_CAL_{old} - \frac{(DACVAL_{new} - DACVAL_{old})}{2}$$

$$RIGHT\_CAL_{new} = RIGHT\_CAL_{old} + \frac{(DACVAL_{new} - DACVAL_{old})}{2}$$

Where $LEFT\_CAL_{new}$ is the new reference value defining the left edge of the displayed image; $LEFT\_CAL_{old}$ is the old reference value defining the left edge of the image; $DAC\_VAL_{new}$ is the new input to D to A convertor 100 defining the new image width; $DAC\_VAL_{old}$ is the old input to D to A convertor 100 defining the old image width; $RIGHT\_CAL_{new}$ is the new reference value defining the right edge of the displayed image; and $RIGHT\_CAL_{old}$ is the old reference value defining the right edge of the displayed image.

It will be appreciated that similar algorithms can be used to adjust the vertical axes reference values stored in touch memory 160 following, for example, an adjustment of the height of the display image by the user. Algorithms for adjusting the vertical and horizontal axes reference values following adjustment of the centering of the displayed image will also be apparent.

Figure 3:
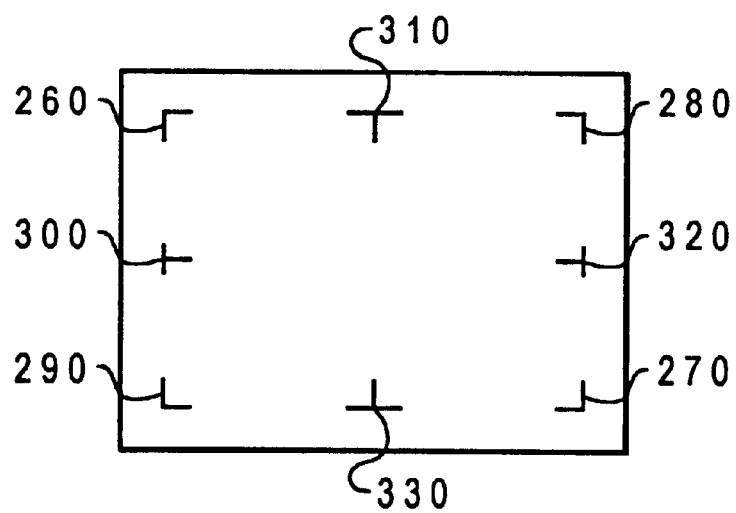
FIG. 3 is a front view of the display screen of the display apparatus showing the location of an enhanced set of calibration points.

In the embodiment of the present invention hereinbefore described, because only the top left and bottom right corners of the displayed image are used by the calibration routine, the field of sensitivity of touch screen 170 can only be maintained in alignment with the image displayed on CRT 10 provided that the displayed image remains rectangular. In other words, only changes in image height, width and centering can be compensated for. Referring now to FIG. 3, in a modification of the embodiment hereinbefore described, host computer system 180, under the control of the calibration routine microcode generates 8 targets 260–330 in the display area on the screen of CRT 10. Targets 260–290 are located in the four corners of the display area. Targets 300–330 are located at the centers of the four vertices of the display area. In operation, each of the targets is used to produce reference values which are stored in touch memory 180 in accordance with the process hereinbefore described. However, it will be appreciated that the additional reference values corresponding to targets 280–330 permit the touch display to compensate for additional image movements. For example, targets 260–300 and 320 permit the touch display to compensate for East-West pin-cushion or trapezoidal distortions in addition to changes in height, width and centering. Targets 310 and 330 permit the touch display to compensate for North-South pin-cushion or trapezoidal distortions.

In the embodiments of the present invention hereinbefore described, the calibration data for touch screen 170 is stored in touch memory 160. It will be appreciated, however, that in other embodiments of the present invention, the calibration data may be stored in a memory of host computer system 180 and updated via bus 250, touch processor 120 and serial communication link 240. Furthermore, in the preferred embodiment of the present invention hereinbefore described, the touch-sensitive display apparatus comprises a touch processor 120 and a separate display processor 140. However, it will be appreciated that, in other embodiments of the present invention, the functions of both touch processor 120 and display processor 140 may be performed by a single processor device in which the function of updating calibration data for touch screen 170 provided by bus 250 is emulated by computer program microcode controlling the single processor.

Preferred embodiments of the present invention have been hereinbefore described with reference to touch-sensitive display apparatus based on a color CRT. However, it will be appreciated that the present invention is equally applicable to touch-sensitive display apparatus having different types of display screen such as, for example, monochrome CRTs or LCD panels of either color or monochrome form. In the embodiments of the present invention hereinbefore described, tactile stimulus was detected by touch sensing means in the form of touch sensitive screen 170. However, it will be appreciated that the present invention is equally applicable to touch sensitive display apparatus having other forms of touch sensing means. For example, the present invention is equally applicable to touch sensitive display apparatus in which the touch sensing means comprises a plinth for supporting a conventional display device. Tactile stimuli of the display screen are transferred to the plinth through the display device. Strain gauges located in the plinth convert the forces exerted on the plinth by the touch stimuli of the display screen into electrical signals indicative of the location of the touch stimuli on the display screen. By way of another example, the present invention is equally applicable to touch sensitive display apparatus in which the touch means comprises an optical system for detecting tactile stimuli of the display screen. The optical system may, for example, comprise a light beam which is scanned across the screen and photo-detector for detecting the location of a tactile stimulus through a corresponding interruption of the passage of the scanned light beam. Alternatively, the optical system may comprise arrays of light sources and photo-detectors mounted on opposite sides of the display screen for detecting the location of a tactile stimulus through an interruption of the passage of light between a corresponding light source/photo-detector pair.

While the invention has been particularly shown and described with reference to a preferred embodiment, it will be understood by those skilled in the art that various changes in form and detail may be made therein without departing from the spirit and scope of the invention.

What is claimed is:

1. A touch-sensitive display apparatus comprising:

a display screen;

a display drive means connected to said display screen for displaying an image within a display area of said display screen in response to an input video signal;

a display processor connected to said display drive means for generating, in response to one or more image control signals, at least one drive control signal for configuring said display drive means to adjust a parameter of said display area such that a selected portion of said display area has a different position relative to said display screen than said selected portion of said display area had when said touch-sensitive display apparatus was last calibrated;

a touch sensing means for generating a touch input signal in response to a tactile stimulus of said display screen, said touch input signal being indicative of a location of said tactile stimulus on said display screen;

a touch processor connected to said touch sensing means for converting, utilizing calibration data stored in a touch memory, said touch input signal into coordinates defining said location of said tactile stimulus on said display screen relative to features in said image displayed within said display area of said display screen;

wherein said display processor includes means for communicating correction data to said touch processor indicative of said different position of said selected portion of said display area relative to said display screen, and said touch processor includes means for automatically adjusting said calibration data stored in said touch memory to re-align said coordinates generated by said touch processor to features of said image in response to said correction data received from said display processor.

2. The touch-sensitive display apparatus of claim 1, wherein said touch sensing means comprises a touch sensitive screen mounted on said display screen.

3. The touch-sensitive display apparatus of claim 1, and further comprising a communication link connecting said touch processor to said display processor.

4. The touch-sensitive display apparatus of claim 3, wherein said communication link comprises a bus.

5. The touch-sensitive display apparatus of claim 1, wherein said touch processor is integral to said display processor.

6. The touch-sensitive display apparatus of claim 1, wherein said display screen comprises a cathode ray tube display screen.

7. The touch-sensitive display apparatus of claim 1, and further comprising a user control connected to said display processor for generating an image control signal in response to a manual input.

8. The touch-sensitive display apparatus of claim 1, and further comprising a system unit for generating said input video signal and said image control signal and for receiving coordinates generated by said touch processor.

9. A method for automatically maintaining the calibration of a touch-sensitive display apparatus, said touch-sensitive display apparatus including a memory, a display screen, and a touch sensing means overlaying said display screen, said method comprising:

displaying a calibration target within a display area of said display screen;

in response to a tactile stimulus of said touch sensing means, calibrating said touch-sensitive display apparatus by storing calibration data within said memory that correlates a location of said tactile stimulus of said touch sensing means and coordinates of said calibration target displayed within said display screen;

thereafter, adjusting a parameter of said display area such that a selected portion of said display area has a different position relative to said display screen than said selected portion of said display area had at said calibration; and in response to said adjustment, automatically recalibrating said touch-sensitive display apparatus by adjusting said calibration data stored within said memory, wherein manual recalibration is unnecessary following adjustment of display parameters.

10. The method for automatically maintaining calibration of a touch-sensitive display apparatus of claim 9, wherein said step of calibrating said touch-sensitive display apparatus comprises storing coordinates of a selected corner of said display area within said memory in association with said location of said tactile stimulus of said touch sensing means.

11. The method for automatically maintaining calibration of a touch-sensitive display apparatus of claim 10, wherein said step of automatically recalibrating said touch-sensitive display apparatus comprises updating said coordinates of said selected corner of said display area within said memory.

12. The method for automatically maintaining calibration of a touch-sensitive display apparatus of claims 9, wherein said step of adjusting a parameter of said display area comprises varying a size of said display area.

13. A touch-sensitive display apparatus, comprising:

a display screen;

a touch sensing means overlaying said display screen;

a processing unit coupled to said display screen, said processing unit including:

a memory;

means for displaying a calibration target within a display area of said display screen;

means, responsive to a tactile stimulus of said touch sensing means, for calibrating said touch-sensitive display apparatus by storing calibration data within said memory that correlates a location of said tactile stimulus of said touch sensing means and coordinates of said calibration target displayed within said display screen;

means for thereafter adjusting a parameter of said display area such that a selected portion of said display area has a different position relative to said display screen than said selected portion of said display area had at said calibration; and means, responsive to said adjustment, for automatically recalibrating said touch-sensitive display apparatus by adjusting said calibration data stored within said memory, wherein manual recalibration is unnecessary following adjustment of display parameters.

14. The touch-sensitive display apparatus of claim 13, wherein said means for calibrating said touch-sensitive display apparatus comprises means for storing coordinates of a selected corner of said display area within said memory in association with said location of said tactile stimulus of said touch sensing means.

15. The touch-sensitive display apparatus of claim 14, wherein said means for automatically recalibrating said touch-sensitive display apparatus comprises means for updating said coordinates of said selected corner of said display area within said memory.

16. The touch-sensitive display apparatus of claim 13, wherein said means for adjusting a parameter of said display area comprises means for varying a size of said display area.

* * * * *